US010379339B1

(12) United States Patent
Rainaut et al.

(10) Patent No.: US 10,379,339 B1
(45) Date of Patent: Aug. 13, 2019

(54) ELECTROWETTING DISPLAY DEVICE CONFIGURATION FOR REFLECTIVE AND TRANSMISSIVE MODES

(71) Applicant: Amazon Technologies, Inc., Seattle, WA (US)

(72) Inventors: Olivier Rainaut, Eindhoven (NL); Toru Sakai, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 15/701,779

(22) Filed: Sep. 12, 2017

(51) Int. Cl.
*G02B 26/00* (2006.01)
*B29D 11/00* (2006.01)
*G02B 5/20* (2006.01)
*G02B 26/02* (2006.01)

(52) U.S. Cl.
CPC ........ *G02B 26/005* (2013.01); *B29D 11/0073* (2013.01); *G02B 5/201* (2013.01); *G02B 26/007* (2013.01); *G02B 26/02* (2013.01); *G02B 2207/115* (2013.01)

(58) Field of Classification Search
CPC .............. G02B 26/00–24; G02F 1/133–13347
See application file for complete search history.

(56) References Cited

U.S. PATENT DOCUMENTS

| | | | | |
|---|---|---|---|---|
| 7,813,030 B2* | 10/2010 | Lo | ........................ | G02B 26/005 345/60 |
| 2009/0059348 A1* | 3/2009 | Niwano | ............... | G02B 26/004 359/296 |
| 2011/0221726 A1* | 9/2011 | Huitema | .............. | G09G 3/3433 345/209 |
| 2013/0141405 A1* | 6/2013 | Huitema | .............. | G02B 26/005 345/205 |
| 2014/0036341 A1* | 2/2014 | Kwon | .................. | G02B 26/005 359/290 |
| 2014/0063586 A1* | 3/2014 | Jung | .................... | G02B 26/005 359/290 |

* cited by examiner

*Primary Examiner* — William R Alexander
*Assistant Examiner* — Jeffrey E Madonna
(74) *Attorney, Agent, or Firm* — Quarles and Brady LLP

(57) ABSTRACT

An electrowetting display device is presented. The device includes a top support plate including a top surface and a bottom surface. A viewing surface of the device is over the top surface of the top support plate. A bottom support plate is positioned opposite the top support plate. A plurality of pixel walls are formed over a bottom surface of the top support plate. The plurality of pixel walls are associated with an electrowetting pixel and define a portion of a volume containing at least a portion of a first fluid and a second fluid. A transparent pixel electrode is on the top support plate and a common electrode is over a top surface of the bottom support plate. The common electrode includes a transparent material.

20 Claims, 7 Drawing Sheets

ELECTROWETTING DISPLAY DEVICE CONFIGURATION FOR REFLECTIVE AND TRANSMISSIVE MODES

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, enhancing user experience and satisfaction continues to be a priority. Moreover, increased multimedia use imposes high demands on designing, packaging, and fabricating display devices, as content available for mobile use becomes more extensive and device portability continues to be a high priority to the consumer.

An electrowetting display includes an array of pixels individually bordered by pixel walls that retain fluid, such as an opaque oil, for example. Light transmission through each pixel is adjustable by electronically controlling a position of the fluid in the pixel.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
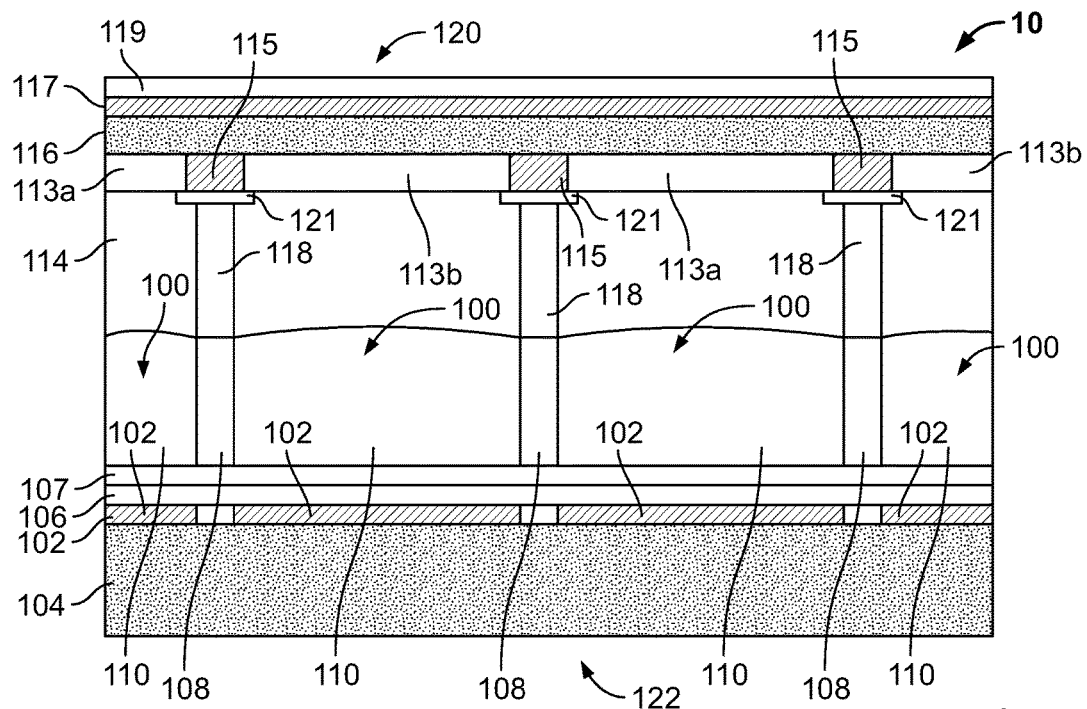
FIGS. 1A and 1B illustrate cross sectional views of a portion of a reflective electrowetting display device.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and a cover layer component, which may include antiglare properties, antireflective properties, anti-fingerprint properties, anti-cracking properties, and the like.

An electrowetting display includes a number of electrowetting pixels fabricated over a first or bottom support plate. Each electrowetting pixel is associated with a number of pixel walls. The pixel walls are configured to define a volume containing at least a portion of a first fluid, such as a black opaque oil. Light transmission through the electrowetting pixels can be controlled by an application of an electric potential or driving voltage to the electrowetting pixels, which results in a movement of a second fluid, such as an electrolyte solution, into or within the electrowetting pixels, thereby displacing the oil.

When an electrowetting pixel is in a rest state (i.e., with no driving voltage applied or at a driving voltage that falls below a threshold value causing the electrowetting pixel to be inactive), the oil is distributed throughout the pixel. The oil absorbs light and the pixel in this condition appears black. But when the driving voltage is applied, the oil is displaced to one or more sides of the pixel. Light can then enter the electrowetting pixel causing the pixel to appear less dark (e.g., white) to an observer. If the electrowetting display is a reflective display, the bottom of each electrowetting pixel includes a reflective surface. In such a display, light will enter the open pixel, strike the reflective surface at the bottom of the pixel and be reflected out of the pixel. If, however, the electrowetting display is a transmissive display, the bottoms of the pixels are transparent and light entering the open pixels passes through the open pixel and the bottom support plate over which the pixels are formed. If a color filter is incorporated over the pixel, the pixel may appear to have color.

The degree to which the oil is displaced from the oil's resting position affects the pixel's perceived brightness. By manipulating the driving voltage applied to the electronic device's electrowetting pixels, different images can be depicted on a display surface of the electronic device.

Electrowetting displays include an array of electrowetting pixels sandwiched between two support plates, such as a bottom support plate and a top support plate. The electrowetting pixels include a stack of various layers of materials built upon a top surface of the bottom support plate, including a fluoropolymer layer, over portions of which the pixel walls are constructed, a barrier layer, electrode layer, and, in the case of reflective displays, a reflective layer. The top support plate is then mounted over the bottom support plate to enclose a volume containing the oil. The top support plate and the bottom support each include electrode layers that operate in combination to subject the various electrowetting pixels to driving voltages, resulting in oil displacement.

In conventional electrowetting display device designs, the stack of material layers making up each electrowetting pixel must be specifically formed for the type of display being fabricated—reflective and transmissive displays require different layers of materials to operate. Specifically, reflective display devices require that the bottom surface of the pixels incorporate a reflective layer so that light can be reflected out of the pixels. In contrast, transmissive displays do not require such a reflective layer.

Because the two types of displays include pixel designs that utilize different layers of material, a bottom support plate that has been fabricated for use in a transmissive display cannot easily be adapted for use in a reflective display. As such, the bottom support plates for reflective and transmissive displays are fabricated using separate fabrication processes for forming the different layers of material over the bottom support plate. Because different processes are used, there may be increased cost and complexity associated with the fabrication of each type of support plate.

In the present approach, however, a new device configuration is presented in which the pixel control elements—that is, the pixel's control switch or transistor—is formed upon the top support plate rather than the bottom support plate. In this configuration, the pixel control structures are fabricated using transparent materials, enabling the top support plate to be utilized in both reflective and transmissive display device configurations. The display device's color filters are formed on the device's bottom support plate.

So configured, the bottom support plate can be combined with the top support plate to fabricate a transmissive-type display device. If, however, the display device is to be a reflective-type device, a reflective layer may be incorporated into the bottom support plate. That reflective surface enables the bottom support plate to be combined with the new top support plate to form a reflective-type display device, with no changes to the configuration of the top support plate.

In this configuration, the reflective surface of the bottom support plate can be formed as a single layer of reflective material across the bottom support plate. This can both simplify the process for fabricating the layer of reflective material and provide a larger reflective surface than that found in conventional devices in which a reflective surface may be formed as a number of patterned shapes over only a portion of the bottom of each of the device's pixels. This larger reflective surface configuration can improve device efficiency by increasing the amount of light reflected out of the device's pixels.

Hereinafter, example embodiments include, but are not limited to, electrowetting displays that include clear, transparent, or semi-transparent top support plates and bottom support plates. The support plates may comprise glass or any of a number of at least partially transparent materials, such as transparent plastic, quartz, and semiconductors, for example, and claimed subject matter is not limited in this respect. "Top" and "bottom" as used herein to identify the support plates of an electrowetting display do not necessarily refer to a direction referenced to gravity or to a viewing surface of the electrowetting display.

A display device, such as an electrowetting display device, may be a transmissive or reflective display that generally includes an array of pixels configured to be operated by an active matrix addressing scheme. In this disclosure, a pixel may, unless otherwise specified, comprise a single sub-pixel or a pixel that includes two or more sub-pixels of an electrowetting display device. Such a pixel or sub-pixel may be the smallest light transmissive, reflective or transflective element of a display that is individually operable to directly control an amount of light transmission through and/or reflection from the element. For example, in some implementations, a pixel may be a red sub-pixel, a green sub-pixel, a blue sub-pixel or a white sub-pixel of a larger pixel or may, in some cases, include a number of sub-pixels. As such, a pixel may be a pixel that is a smallest component, e.g., the pixel does not include any sub-pixels. The present disclosure describes embodiments of display devices that may be used in accordance with a number of different pixel configurations, including monochrome or black and white configuration and various color arrangements, such as RGB and RGB-W sub-pixel arrangements.

Rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) associated with each pixel. The transistors take up a relatively small fraction of the area of each pixel to allow light to efficiently pass through (or reflect from) the display pixel.

In some embodiments, an electrowetting display comprises an array of pixels sandwiched between a bottom support plate and a top support plate. The pixels may be made up of one or more layers of transparent or opaque materials. Herein, describing a pixel or material as being transparent generally means that the pixel or material may transmit or enable the propagation of a relatively large fraction of the light incident upon it. For example, a transparent material or layer may transmit or propagate more than 70% or 80% of the light impinging on its surface, though claimed subject matter is not limited in this respect. In contrast, opaque generally means that the pixel or material may block or inhibit the transmission or propagation of at least a portion of the visible light spectrum incident upon it. For example, a black opaque material or layer may block, absorb, or otherwise prevent the propagation of more than 70% or 80% of the light impinging on its surface, though claimed subject matter is not limited in this respect. In the present disclosure, materials that are described as preventing the propagation of light shall be understood to prevent propagation of at least 70% of the light striking the material. Alternatively, opaque material may be transmissive for a portion of the visible light spectrum and blocking other portions, forming a color filter. Similarly, materials that are described as being transparent or allowing propagation of light shall be understood to transmit or propagate at least 70% of the light striking the material. In this description, the visible light spectrum may include light having a wavelength between 390 nanometers (nm) and 700 nm.

Pixel walls retain at least a first fluid that is electrically non-conductive in the individual pixels. For example, the first fluid may include an opaque or colored oil. References in the present disclosure to an oil shall be understood to refer to any fluid that is electrically non-conductive. Each pixel includes a cavity formed between the support plates that is at least partially filled with the oil (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing in some embodiments. The second fluid is immiscible with the first fluid. Herein, substances are immiscible with one another if the substances do not substantially form a solution.

Individual reflective electrowetting pixels may include a reflective layer on the bottom support plate of the electrowetting pixel, a transparent electrode layer adjacent to the reflective layer, and a hydrophobic layer on the electrode layer. Alternatively, the reflective layer may act as the pixel electrode. Transmissive electrowetting pixels do not include a reflective layer in the stack of layers formed over the bottom support plate and are instead generally transparent. Pixel walls, associated with and formed around each pixel, the hydrophobic layer, and the top support plate at least partially enclose a fluid volume that includes an electrolyte solution and the oil, which is immiscible with the electrolyte solution. An "opaque" fluid, as described herein, is used to describe a fluid that appears black or to have color to an observer. For example, an opaque fluid appears black to an observer when it strongly absorbs a broad spectrum of wavelengths (e.g., including those of red, green and blue light) in the visible region of light or electromagnetic radiation. In some embodiments, the opaque fluid is a non-polar electrowetting oil.

The opaque fluid is disposed in the fluid region. A coverage area of the opaque fluid on the bottom hydrophobic layer is electrically adjustable to affect the amount of light incident on the electrowetting display that reaches the reflective material at the bottom of each reflective pixel or that passes through each transmissive pixel.

In addition to pixels, pixel spacers and edge seals may also be located between the two support plates. Pixel spacers and edge seals that mechanically connect the first support plate with and opposite to the second overlying support plate, or which form a separation between the first support plate and the second support plate, can contribute to the mechanical integrity of the electrowetting display. Edge seals, for example, being disposed along a periphery of an array of electrowetting pixels, may contribute to retaining fluids (e.g., the first and second fluids) between the first support plate and the second support plate. Pixel spacers can be at least partially transparent so as to not hinder throughput of light in the electrowetting display. The transparency of pixel spacers may at least partially depend on the refractive index of the pixel spacer material, which can be similar to or the same as the refractive indices of surrounding media. Pixel spacers may also be chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image and/or video data. The code may cause the processor to modulate the optical properties of pixels by controlling electrical signals (e.g., voltages, currents, and fields) on, over, and/or in layers of the electrowetting display.

Figure 1B:
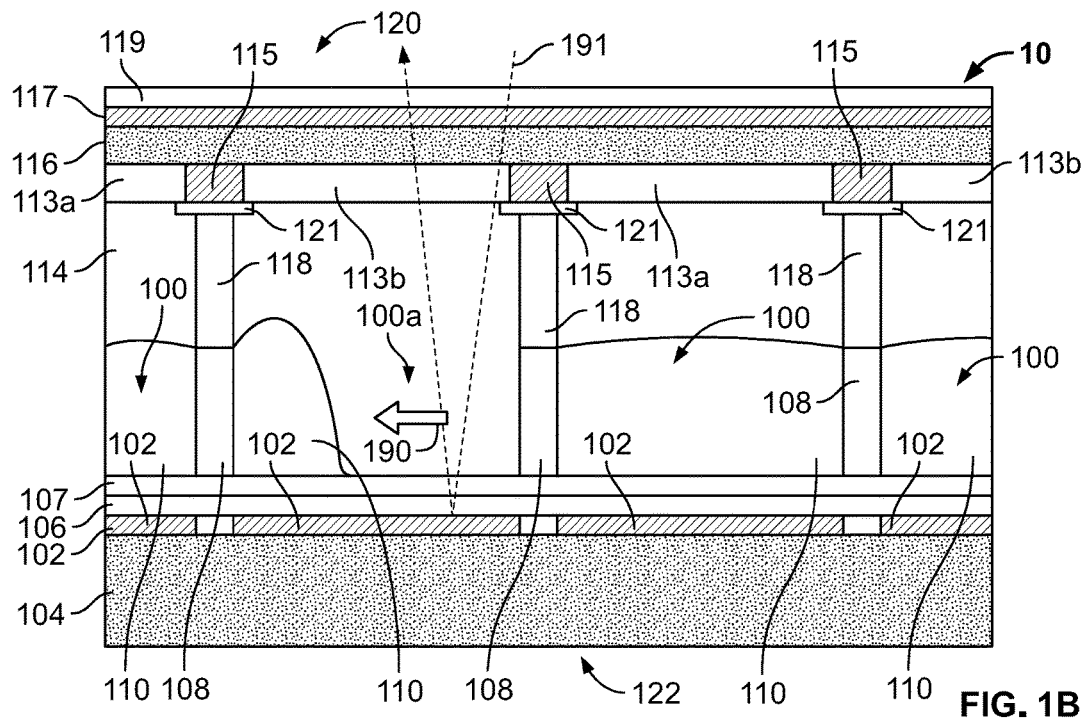
Figure 2:
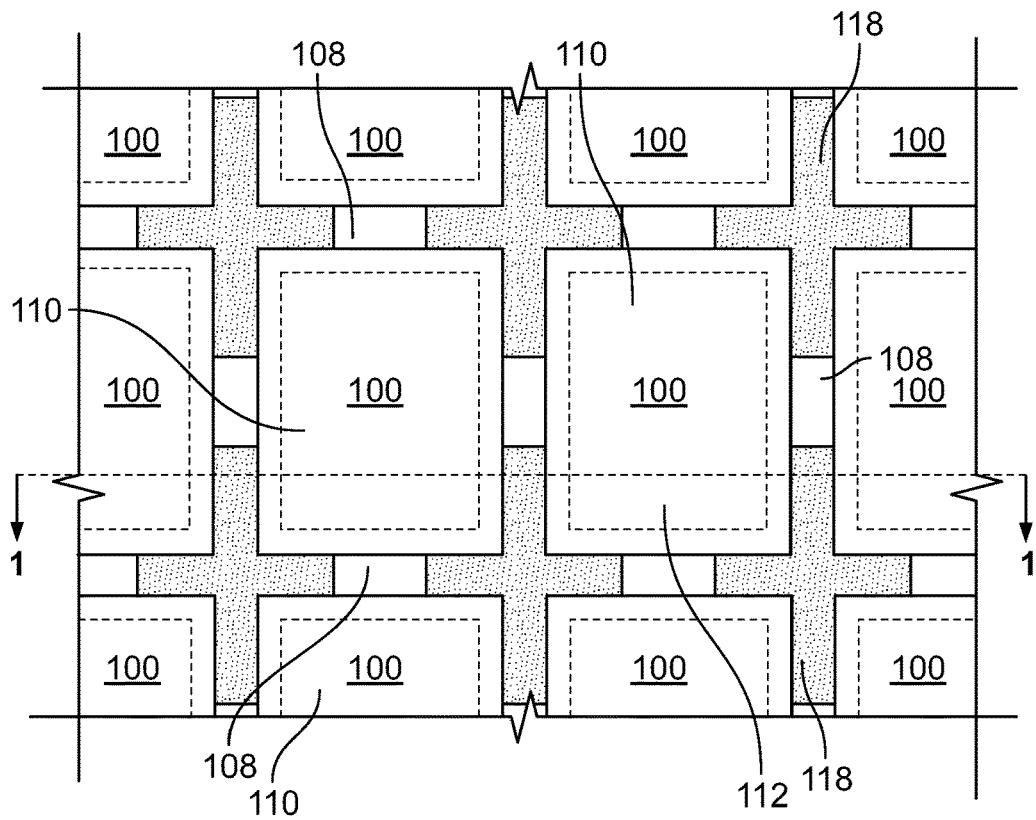
FIG. 2 illustrates a top view of the electrowetting pixels of FIG. 1A, according to various embodiments.

FIG. 1A is a cross sectional view of a portion of an example conventional reflective electrowetting display device 10 illustrating several electrowetting pixels 100 taken along sectional line 1-1 of FIG. 2. FIG. 1B shows the same cross sectional view as FIG. 1A in which an electric potential has been applied to one of the electrowetting pixels 100 causing displacement of an oil disposed therein, as described below. FIG. 2 shows a top view of electrowetting pixels 100 formed over a bottom support plate 104 as well as pixel spacers 118. The view shown in FIG. 2 is simplified and does not depict each component illustrated in FIGS. 1A and 1B and primarily illustrates the row and column layout of pixels 100 with pixel spacers 118.

In FIGS. 1A and 1B, two complete reflective electrowetting pixels 100 and two partial electrowetting pixels 100 are illustrated. Electrowetting display device 10 may include any number (usually a very large number, such as thousands or millions) of electrowetting pixels 100.

An electrode layer is formed on a bottom support plate 104. In various embodiments, the electrode layer may consist of individual pixel electrodes, each addressing an individual pixel. The individual pixel electrodes may be connected to a transistor, such as a thin film transistor (TFT) (not shown), that is switched or otherwise controlled to either select or deselect an electrowetting pixel 100 using an active matrix addressing scheme, for example. A TFT is a particular type of field-effect transistor that includes thin films of an active semiconductor layer as well as a dielectric layer and metallic contacts over a supporting (but non-conducting) substrate, which may be glass or any of a number of other suitable transparent or non-transparent materials, for example. The TFTs and corresponding data lines may be formed within the electrode layer or within other layers over or within support plate 104.

A reflective layer is formed over support plate 104. The reflective layer generally includes a number of patterned metal reflectors 102, which may form the electrodes of pixels 100. Patterned reflectors 102 may formed from or within all or part of the electrode layer described above or may be a separate layer of material. As depicted, patterned reflectors 102 may not cover the entire bottom surface of each pixel 100. As such, light that strikes the bottom of a pixel 100 at the edge of the bottom surface of the pixel 100 may not strike that pixel's patterned reflector 102 and may instead be absorbed by the structure of pixel 100. This can, in turn, reduce the overall efficiency of the pixel 100 as, when the pixel 100 is opened, not all light entering the pixel 100 will be reflected out of the pixel 100. When a pixel 100 is open, allowing light to enter pixel 100, the light reflects from patterned reflectors 102 out of the pixel 100 and can be seen by a viewer.

Dielectric barrier layer 106 may at least partially separate the layer of patterned reflectors 102 from a hydrophobic layer 107, also formed on bottom support plate 104. Barrier layer 106 may be formed from various materials including organic/inorganic multilayer stacks or layers. In some embodiments, hydrophobic layer 107 is an amorphous fluoropolymer layer including any suitable fluoropolymer(s), such as AF1600®, produced by DuPont, based in Wilmington, Del. Hydrophobic layer 107 may also include suitable materials that affect wettability of an adjacent material, for example.

Pixel walls 108 form a patterned electrowetting pixel grid on hydrophobic layer 107. Pixel walls 108 may comprise a photoresist material such as, for example, epoxy-based negative photoresist SU-8. The patterned electrowetting pixel grid comprises rows and columns that form an array of electrowetting pixels. For example, an electrowetting pixel may have a width and a length in a range of about 50 to 500 microns or micrometers.

Oil 110 (or another opaque fluid), which may have a thickness (e.g., a height) in a range of about 1 to 10 microns, for example, overlays hydrophobic layer 107. Oil 110 is partitioned by pixel walls 108 of the patterned electrowetting pixel grid. A second fluid 114, such as an electrolyte solution, overlays oil 110 and pixel walls 108 of the patterned electrowetting pixel grid. Oil 110 is immiscible with second fluid 114.

Top support plate 116 is mounted over bottom support plate 104 to enclose a volume containing oil 110 and second fluid 114. Support plate 116 is generally transparent and may include a material such as glass, transparent thermoplastic, or the like. A color filter layer including color filters 113 is formed over a bottom surface (as illustrated in FIGS. 1A and 1B) of support plate 116.

Color filters 113a, 113b (collectively, 113) may be positioned over each of pixels 100. Each color filter 113 may be configured to be substantially transparent to particular ranges of wavelengths of light, while absorbing others. For example, color filter 113a may be transparent to red light having wavelengths ranging from 620 nm to 750 nm, while absorbing light having other wavelengths. Conversely, color filter 113b may be transparent to green light having wavelengths ranging from 495 nm to 570 nm, while absorbing light having other wavelengths. Various pixels 100 within device 10 may be associated with color filters 113 that are transparent to all wavelengths of visible light, namely visible white light. As used herein, visible light refers to wavelengths of electromagnetic radiation visible to the human eye. Generally, this includes electromagnetic radiation having wavelengths between about 400 nm to about 700 nm.

Color filters 113, therefore, may be utilized to assign each pixel 100 a color, so that when a particular pixel 100 is in an open or at least partially open state, light reflected by that pixel 100 will take on the color of the color filter 113 positioned over that pixel 100.

A number of black matrix components 115 are also formed over a surface of top support plate 116. Black matrix components 115 are generally positioned over each pixel wall 108 in device 10 when top support plate 116 is mounted over bottom support plate 104. Black matrix components 115 are configured to block or absorb all wavelengths of visible light and therefore reduce an amount of light that may enter device 10 over one pixel 100 while exiting device 10 over a different pixel 100.

An electrode layer 121 is patterned over support plate 116 to operate in conjunction with the individual pixel electrodes (e.g., patterned reflectors 102) of the bottom support plate 104 to subject the individual electrowetting pixels 100 to their respective driving voltages. Electrode layer 121 may include patterned regions of a transparent, but conductive material, such as indium tin oxide (ITO).

Pixel spacers 118 are attached to support plate 116 over electrode layer 121. When top support plate 116 is mounted over bottom support plate 104, pixel spacers 118 rest upon a top surface of one or more pixel walls 108, as depicted in FIGS. 1A and 1B. Multiple pixel spacers 118 may be interspersed throughout the array of pixels 100. The dimensions and shape of pixel spacers 118 are not generally constrained—alternative shapes include crosses, lines of pixel spacers, or full grid pixel spacer structures.

As shown in FIGS. 1A and 1B, pixel spacers 118 are generally located over pixel walls 108 and therefore do not interfere substantially with light entering and being reflected out of electrowetting pixels 100. FIG. 2 shows a cross sectional view of electrowetting pixels 100 including pixel walls 108 and the pixel spacers 118 resting upon the pixel walls 108. As illustrated, pixel spacers 118 are shaped so that they are located over pixels walls 108. This shape of pixel spacers 118 reduces the likelihood that pixel spacers 118 will interfere with or potentially block light entering or being reflected out of pixels 100.

Returning to FIGS. 1A and 1B, in some embodiments of device 10, a front light component may be positioned over an edge of viewing surface 120 of device 10. In these embodiments, a light guide 117 may be positioned over device 10 to guide light generated by the front light component over viewing surface 120 of device 10. A layer 119, e.g. glass or other material, incorporating various touch-sensitive structures may also be positioned over device 10. A diffuser film (not shown) may be formed over or, in some cases, integrated into, a portion of, top support plate 116 to diffuse light striking a surface of top support plate 116 and passing therethrough.

Display device 10 in the reflective configuration shown in FIGS. 1A and 1B has viewing surface 120 on which an image formed by electrowetting display device 10 may be viewed, and an opposing rear side 122. Support plate 116 faces viewing surface 120 and bottom support plate 104 faces rear side 122. Reflective electrowetting display device 10 may be a segmented display type in which the image is built of segments. The segments may be switched simultaneously or separately. Each segment includes one electrowetting pixel 100 or a number of electrowetting pixels 100 that may be adjacent or distant from one another. Electrowetting pixels 100 included in one segment are switched simultaneously, for example. Electrowetting display device 10 may also be an active matrix driven display type or a passive matrix driven display, for example.

As mentioned above, second fluid 114 is immiscible with oil 110. Second fluid 114 is electrically conductive and/or polar, and may be water or a salt solution such as a solution of potassium chloride in water, for example. In certain embodiments, second fluid 114 is transparent, but may be colored or light-absorbing. Oil 110 is electrically non-conductive and may for instance be an alkane like hexadecane or silicone oil.

Hydrophobic layer 107 is arranged on bottom support plate 104 to create an electrowetting surface area. The hydrophobic character of hydrophobic layer 107 causes oil 110 to adhere preferentially to hydrophobic layer 107 because oil 110 has a higher wettability with respect to the surface of hydrophobic layer 107 than second fluid 114 in the absence of a driving voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

In some embodiments, oil 110 absorbs light within at least a portion of the optical spectrum and so may form a color filter. The fluid may be colored by addition of pigment particles or dye, for example. Alternatively, oil 110 may be black (e.g., absorbing substantially all light within the optical spectrum) or reflecting. Hydrophobic layer 107 may be transparent or reflective. A reflective layer may reflect light within the entire visible spectrum, making the layer appear bright, or reflect a portion of light within the visible spectrum, making the layer have a color.

If a driving voltage is applied across an electrowetting pixel 100, electrowetting pixel 100 will enter into an active or at least partially open state. Electrostatic forces will move second fluid 114 toward the electrode layer (i.e., patterned reflector 102) at the bottom of the active pixel, thereby displacing oil 110 from that area of hydrophobic layer 107 to pixel walls 108 surrounding the area of hydrophobic layer 107, to a droplet-like form. Such displacing action at least partly uncovers oil 110 from the surface of hydrophobic layer 107 of electrowetting pixel 100. Due to the configuration of the electrode layer, when the voltage is applied across the electrowetting pixel 100, oil 110 generally always move in the same direction within the pixel 100 so as to form into a droplet against the same wall 108 of the pixel 100.

FIG. 1B shows one of electrowetting pixels 100 in an active state (see pixel 100a). With a driving voltage applied to a pixel electrode in the electrode layer underneath the activated electrowetting pixel 100a, second fluid 114 is attracted towards the pixel electrode in the electrode layer displacing oil 110 within the activated electrowetting pixel 100.

As second fluid 114 moves towards hydrophobic layer 107 of the activated electrowetting pixel 100, oil 110 is displaced in a predictable direction within pixel 100a towards one of pixel walls 108 (e.g., in the direction of arrow 190), referred to herein as the oil displacement direction, and moves towards a pixel wall 108 of the activated pixel 100 or is otherwise displaced. The predictable direction 190 of oil 110 movement may result from the floor of pixel 100a (e.g., the top surface of hydrophobic layer 107 being at least partially raised at the far right of pixel 100a (as viewed in 1B). This may promote second fluid 114 entering pixel 100a at the right side of pixel 100a and promoting movement of oil 110 in direction 190.

In the example of FIG. 1B, pixel 100a is fully open at a maximum driving voltage and oil 110 of pixel 100a has formed a droplet over an oil accumulation area of pixel 100a as a result of the driving voltage being applied to pixel 100a.

With oil 110 of pixel 100a displaced following the application of a driving voltage to pixel 100a, light 191 can enter pixel 100a through color filter 113b, strike the exposed portion of the patterned reflector 102 at the bottom of pixel 100a, and reflect back out through color filter 113b.

After activation of pixel 100a, when the voltage across electrowetting pixel 100a is returned to an inactive value level of zero or a value near to zero, electrowetting pixel 100a will return to an inactive or closed state, where oil 110 flows back to cover hydrophobic layer 107 and patterned reflector 102. In this way, oil 110 forms an electrically controllable optical switch in each electrowetting pixel 100.

Figure 1C:
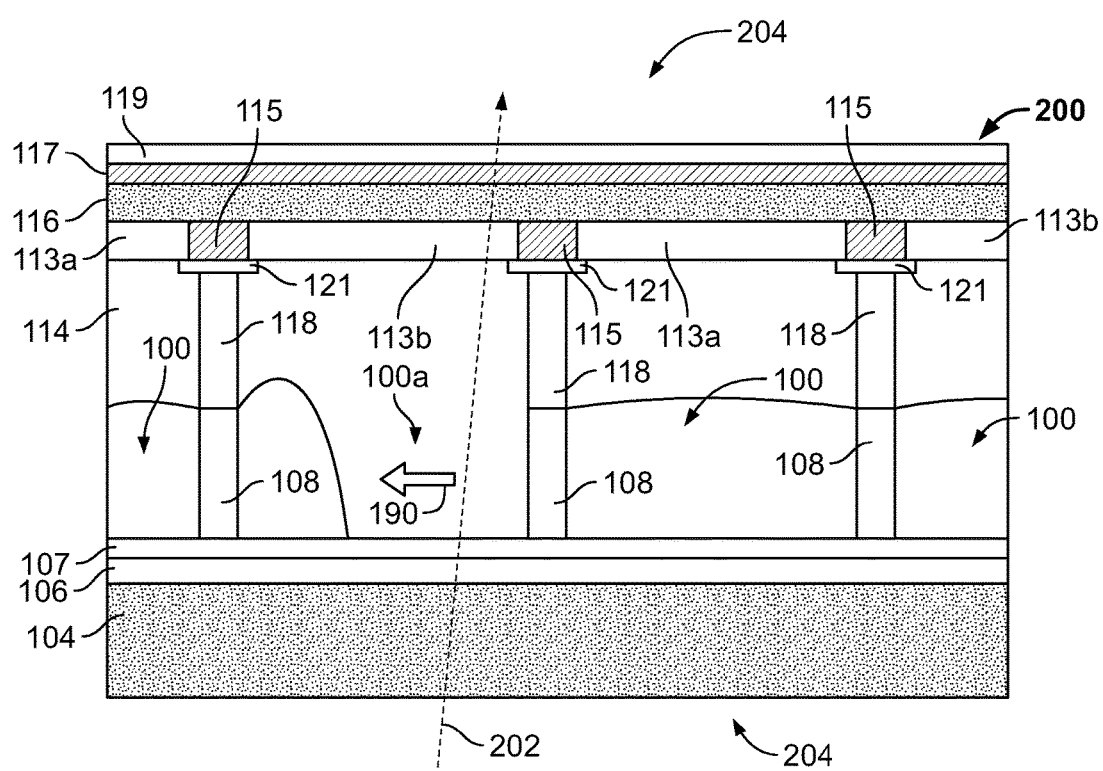
FIG. 1C illustrates a cross sectional view of a portion of a transmissive electrowetting display device.

To illustrate the difference between a reflective device design (shown in FIGS. 1A and 1B) and a transmissive device, FIG. 1C is a cross sectional view of a portion of an example transmissive electrowetting display device 200 in which an electric potential has been applied to one of the electrowetting pixels 100 causing displacement of an oil disposed therein, as described below. FIG. 1C generally depicts device 10 of FIGS. 1A and 1B modified to operate in a transmissive mode.

As shown in FIG. 1C, an electric potential applied to a transparent electrode (not shown) in the activated pixel 100a has caused displacement of oil 110 enabling light 202 to enter and pass through the activated pixel 100. In device 200, however, no reflective layer is formed at the bottom of the activated pixel 100. As such light 202 can pass through the activated pixel 100 and, specifically, through bottom support plate 104 when entering the activated pixel 100.

In this transmissive configuration, device 200 has viewing surface 204 that enables a viewer to observe light that has passed through the activated pixel 100 (including the color filter 113 over the activated pixel 100). As such, an image can be formed on viewing surface 204 of device 200.

The stack of layers formed over the bottom support plate 104 in the reflective and transmissive configurations is different. Specifically, the reflective configuration (shown in FIGS. 1A and 1B) includes patterned reflectors 102, while the transmissive configuration (shown in FIG. 1C) does not.

In the present disclosure, an alternative pixel design is presented in which the pixel configuration for both reflective and transmissive electrowetting display devices is the same or very similar. Using the present design, a bottom support plate configured for use in a transmissive electrowetting display can be modified by the application of one or more layers of material to the bottom support plate for use in a reflective display device. This modification does not require changes to the configuration of the pixels or, specifically, the one or more layers of material making up the pixels formed over the top support plate of the device.

Figure 3:
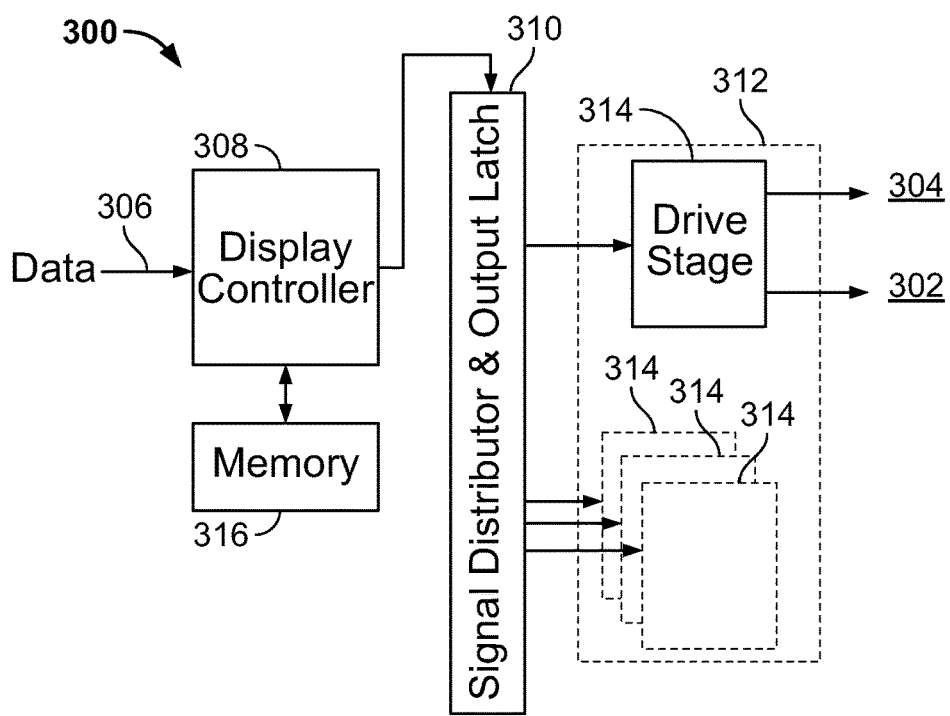
FIG. 3 is a block diagram of an example embodiment of an electrowetting display driving system, including a control system of the electrowetting display device.

FIG. 3 shows a block diagram of an example embodiment of an electrowetting display driving system 300, including a control system of the display device. Display driving system 300 can be of the so-called direct drive type and may be in the form of an integrated circuit adhered or otherwise connected to bottom support plate 104. Display driving system 300 includes control logic and switching logic, and is connected to the display by means of electrode signal lines 302 and a common signal line 304. Each electrode signal line 302 connects an output from display driving system 300 to a different electrode within each pixel 100, respectively. Common signal line 304 is connected to second fluid 114 through a common electrode. Also included are one or more input data lines 306, whereby display driving system 300 can be instructed with data so as to determine which pixels 100 should be in an active or open state and which pixels 100 should be in an inactive or closed state at any moment of time. In this manner, display driving system 300 can determine a target reflectance value for each pixel 100 within the display.

Electrowetting display driving system 300 as shown in FIG. 3 includes a display controller 308, e.g., a microcontroller, receiving input data from input data lines 306 relating to the image to be displayed. Display controller 308, being in this embodiment the control system, is configured to apply a voltage to the first electrode to establish a particular display state (i.e., reflectance value) for a pixel 100. The microcontroller controls a timing and/or a signal level of at least one pixel 100.

The output of display controller 308 is connected to the data input of a signal distributor and data output latch 310. Signal distributor and data output latch 310 distributes incoming data over a plurality of outputs connected to the display device, via drivers in certain embodiments. Signal distributor and data output latch 310 cause data input indicating that a certain pixel 100 is to be set in a specific display state to be sent to the output connected to pixel 100. Signal distributor and data output latch 310 may be a shift register. The input data is clocked into the shift register and at receipt of a latch pulse the content of the shift register is copied to signal distributor and data output latch 310. Signal distributor and data output latch 310 has one or more outputs, connected to a driver assembly 312. The outputs of signal distributor and data output latch 310 are connected to the inputs of one or more driver stages 314 within electrowetting display driving system 300. The outputs of each driver stage 314 are connected through electrode signal lines 302 and common signal line 304 to a corresponding pixel 100. In response to the input data, a driver stage 314 will output a voltage of the signal level set by display controller 308 to set one of pixels 100 to a corresponding display state having a target reflectance level.

To assist in setting a particular pixel to a target reflectance level, memory 316 may also store data that maps a particular driving voltage for a pixel to a corresponding reflectance value and vice versa. The data may be stored as one or more curves depicting the relationship between driving voltage and reflectance value, or a number of discrete data points that map a driving voltage to a reflectance value and vice versa. As such, when display controller 308 identifies a target reflectance value for a particular pixel, display controller 308 can use the data mapping driving voltage to reflectance value to identify a corresponding driving voltage. The pixel can then be driven with that driving voltage.

As described above, in conventional electrowetting display device designs, the stack of material layers making up each electrowetting pixel over the bottom support plate must be specifically arranged for the type of display being fabricated—reflective and transmissive displays require different layers of material underneath the device's pixels to operate. In the present approach, however, a top support plate design is provided in which the layers of the device's electrowetting pixels are the same, or substantially the same, for both transmissive and reflective displays. Specifically, the stack of layers making up the electrowetting pixels of both types of displays do not incorporate a reflective layer and instead include pixel control switches (i.e., transistors) and connected electrodes fabricated using transparent materials. In a default configuration, this allows the top support plate to be incorporated directly into transmissive display devices, as described below.

If, however, the new top support plate is to be used in a reflective display device, a reflective layer can be formed within or attached to the device's bottom support plate. This does not require modification of the top support plate, thereby simplifying the fabrication process of such a reflective-type display device because the pixel design is unchanged from the transmissive configuration.

Figure 4:
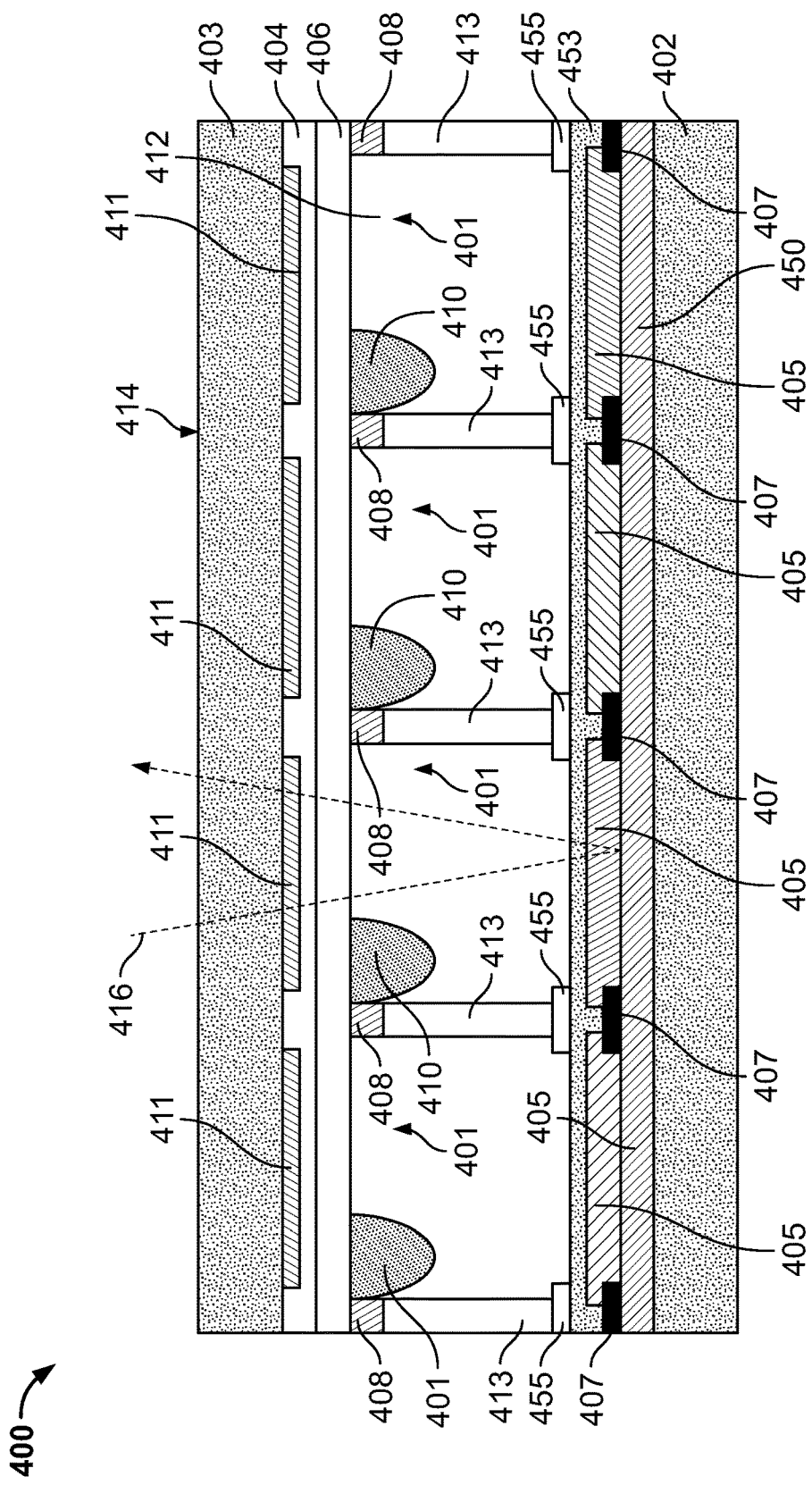
FIG. 4 is a cross sectional view of a portion of an electrowetting display device incorporating the present top support plate design and in a reflective-mode configuration.

FIG. 4 is a cross sectional view of a portion of electrowetting display device 400 incorporating the present top support plate design. Device 400 is configured as a reflective display device. FIG. 4 shows device 400 with an electric potential applied to each depicted electrowetting pixel 401 of device 400 causing displacement of the oil 410 in each pixel 401. In this configuration, each pixel 401 is considered open or activated allowing light to enter each depicted pixel 401.

As shown, device 400 includes a bottom support plate 402 over which top support plate 403 is mounted. Reflective layer 450 is formed over a top surface of bottom support plate 402. Reflective layer 450 may include any suitable material configured to reflect light and, specifically, reflect light in the visible spectrum. In an embodiment, reflective layer 450 may include a metal that may be laminated or otherwise adhered to support plate 402. An optical adhesive, such as an optically-matched glue or adhesive, may be used to adhere reflective layer 450 to support plate 402. Reflective layer 450 could also be formed by coating a surface of bottom support plate 402 with multiple layers of relatively high and low refractive index materials, such as composites made of aluminum neodymium.

As such, the formation of reflective layer 450 on bottom support plate 402 may not require the complex photolithographic steps that might otherwise be required if the reflective layer were to be incorporated into the pixel structure (as is common in conventional devices and depicts in FIGS. 1A and 1B). The formation of reflective layer 450, therefore, may be more cost-effective and simple, potentially resulting in potentially fewer optical defects in device 400.

Reflective layer 450 is formed as a single contiguous layer of reflective material (e.g., metal) over bottom support plate 402. As such, reflective layer 450 can be formed as a contiguous blanket layer over the entire display area of device 400 underneath the various pixels 401 of device 400, potentially resulting in higher reflectance in reflective-mode display devices. The display area of device 400 may include the area of bottom support plate 402 over which pixels 401 are positioned. This configuration of reflective layer 450 may provide a larger reflective surface than that found in conventional devices in which reflective surfaces may be formed as a number of patterned shapes over only a portion of the bottom of each of the device's pixels.

In the embodiment of FIG. 4, a number of black matrix components 407 are formed over reflective layer 450. Black matrix components 407 are formed beneath pixel walls 408 and pixel spacers 413 and are configured to absorb light. As such, black matrix components 407 can absorb light that may enter device 400 through a first pixel 401, pass through one or more of a pixel wall 408 and a pixel spacer 413, and be reflected out of device 400 through a different pixel 401. In this manner, black matrix components 407 can operate to minimize cross-talk within device 400 in which light transitions between pixels 401 as the light pass through device 400. Cross-talk is a phenomenon where light entering the display device through one pixel passes through one of that pixel's walls and exits the device through a neighboring pixel. This can result in visual artifacts in the device because light that has taken on the color associated with a first pixel may exit the display device through a pixel associated with a different color. In some embodiments, black matrix components may be formed outside the display area of device 400 over bottom support plate 402. In that case, the black matrix components formed outside the display area may assists in aligning the placement of color filters 405 over bottom support plate 402. In that case, color filters 405 may include "color dots" that are aligned to an alignment key provided by those black matrix components.

A number of color filters 405 are formed over reflective layer 450 and black matrix components 407. As explained above, each color filter 405 may be configured to allow a particular color (or range of colors) of light to pass through color filter 405, while blocking light of different colors. In some cases, color filters 405 may be white color filters, allowing all visible light to pass through. Light can enter an open pixel 401 moving downwards (with respect to FIG. 4), and will take on the color of that pixel 401's respective color filter 405 as the light is reflected by reflective layer 450. In this manner, color filters 405 associate each of pixels 401 with a particular color, enabling device 400 to generate color images. Furthermore, in this configuration (as contrasted to designs in which the color filter is formed on the top support plate (e.g., color filters 113 of FIGS. 1A-1C), light passing through color filters 405 will tend to only pass through the color filtering material in a single pass, rather than entering and exiting the material multiple times (e.g., first, as the light enters the pixel and then second as the light is reflected back out of the pixel through the color filter). This can reduce visual artifacts as compared to conventional devices as the present design reduces the number of interfaces the light passes through (i.e., interfaces of materials have different indices of refraction). This can, in turn, reduce the degree to which light is dispersed as it is reflected out of device 400 as compared to conventional designs reducing visual artifacts. Furthermore, the present design reduces parallax effects that may occur in conventional devices where the color filters and reflective surface are at opposite sides of the device's pixels and are, therefore, separated from one another by some distance. In contrast, in the present design, the color filters sit upon the reflective surface reducing the distance between those structures and, in turn, parallax effects that may result in further visual artifacts may be minimized.

Organic layer 453 acts as an overcoat and is formed over color filters 405. A common electrode 455 is formed over organic layer 453. In this embodiment, common electrode 455 is formed from a transparent and conductive material, such as ITO. As depicted in FIG. 4, common electrode 455 is patterned over organic layer 453 so as to be primarily located underneath pixel spacers 413 and pixel walls 408. To the extent that common electrode 455 inhibits light transmission, patterning common electrode 455 in this manner can minimize an amount of light blocked by the structure of common electrode 455, even if common electrode 455 is substantially transparent.

In some embodiments, common electrode 455 may be electrically coupled to reflective layer 450 so that reflective layer 450 also operates as part of the common electrode of bottom support plate 402. In that case, common electrode 455 and reflective layer 450 may be coupled to one another by one or more conductive vias, for example. In some further embodiments, reflective layer 450 may provide the functionality of a common electrode (i.e., by being set to a common voltage) and, in that case, common electrode 455 may not be necessary and may not be included in device 400.

Pixels 401 are formed on top support plate 403. Specifically, as depicted in FIG. 4, pixels 401 are formed over or upon a bottom surface of top support plate 403. Top support plate 403 may include glass or any of a number of transparent materials, such as transparent plastic, quartz, and semiconductors, for example.

An electrode layer is formed on top support plate 403. In various embodiments, the electrode layer may consist of one or more transparent individual pixel electrodes 411, each addressing an individual pixel. For example electrodes 411 may include ITO, conductive organic polymers, or other transparent conductive material. The individual pixel electrodes 411 may be connected to a transistor, such as a TFT (not shown), which may also be constructed using at least partially transparent materials. The transistors for each pixel 401 are generally configured to be switched or otherwise controlled to either select or deselect an electrowetting pixel 401 using an active matrix addressing scheme, for example. The TFTs and corresponding data lines may be formed within the electrode layer or within other layers over or within support plate 403. In an embodiment, the transistor associated with each pixel 401 may be embedded at least partially within dielectric barrier layer 404. In that case, to prevent light being reflected by the metal layers making up a portion of the transistors, transparent material (e.g., having an index of refraction greater than 2.0) can be formed between top support plate 403 and the structure of the transistors. In some cases, black matrix components (i.e., configured to absorb all visual light) may be formed in or over top support plate 403 above the metal layers making up a portion of the transistors to prevent light being reflect out of device 400 by those metal layers.

Dielectric barrier layer 404 is formed over the bottom surface of top support plate 403 and may at least partially separate top support plate 403 from hydrophobic layer 406, also formed over top support plate 403. Barrier layer 404 may be formed from various materials including organic/inorganic multilayer stacks or layers. In some embodiments, hydrophobic layer 406 is an amorphous fluoropolymer layer including any suitable fluoropolymer(s), such as AF1600®, produced by DuPont, based in Wilmington, Del. Hydrophobic layer 406 may also include suitable materials that affect wettability of an adjacent material, for example.

Pixel walls 408 form a patterned electrowetting pixel grid on hydrophobic layer 406 over the bottom surface of top support plate 403. Pixel walls 408 may comprise a photoresist material such as, for example, epoxy-based negative photoresist SU-8. The patterned electrowetting pixel grid comprises rows and columns that form an array of electrowetting pixels 401.

Top support plate 403 is mounted over bottom support plate 402. In this configuration, when top support plate 403 is mounted over bottom support plate 402, pixel walls 408 rest upon a top surface of pixel spacers 413, which are, in turn, coupled to bottom support plate 402. With device 400 so constructed, device 400 has viewing surface 414 on which an image formed by electrowetting display device 400 may be viewed. In some embodiments a number of additional layers of materials or structure may be formed over the top surface of top support plate 403, in which case viewing surface 414 may instead be a surface of one of the additional material layers or structures.

Oil 410 (or another opaque fluid) is deposited between top support plate 403 and bottom support plate 402. A second fluid 412, such as an electrolyte solution, is also deposited between top support plate 403 and bottom support plate 402. Oil 410 is immiscible with second fluid 412.

Second fluid 412 is electrically conductive and/or polar, and may be water or a salt solution such as a solution of potassium chloride in water, for example. In certain embodiments, second fluid 412 is transparent, but may be colored or light-absorbing. Oil 410 is electrically non-conductive and may for instance be an alkane like hexadecane or (silicone) oil.

Hydrophobic layer 406 causes oil 410 to adhere preferentially to hydrophobic layer 406 because oil 410 has a higher wettability with respect to the surface of hydrophobic layer 406 than second fluid 412 in the absence of a driving voltage. Even in an inverted configuration (such as that illustrated in FIG. 4), where hydrophobic layer 406 is above oil 410, oil 410 will adhere to hydrophobic layer 406 preferentially. In some embodiments, a density of oil 410 may be less than a density of second fluid 412, which further can promote movement of oil 410 upwards (as depicted in FIG. 4) towards and against hydrophobic layer 406. In this configuration, as compared to a conventional device (see FIGS. 1A-1C), the oil contained with the electrowetting pixels is nearer a viewer's eye. This can, in turn improve the viewing angle of the device. Because the opening in an activated pixel 401 is further from reflective layer 450 than would be found in a conventional device, light being reflected out of the activated pixel 401 may be more collimated than if the opening formed by the oil were nearer the reflective layer (i.e., as found in conventional devices). This can, in turn, improve the perceived sharpness of the image rendered by display 400 at viewing surface 414 and potentially reduce visual artifacts therein.

A driving voltage is applied to an electrowetting pixel 401 by establishing an appropriate driving voltage across the pixel's pixel electrode 411 and common electrode 455 and, potentially, reflective layer 450 is reflective layer 450 is electrically connected to common electrode 455. If a driving voltage is applied across an electrowetting pixel 401 in this manner, the electrowetting pixel 401 will enter into an active or at least partially open state. Electrostatic forces will move second fluid 412 toward the pixel electrode 411 of the active pixel 401, thereby displacing oil 410 from that area of hydrophobic layer 406 to pixel walls 408 surrounding the area of hydrophobic layer 406, to a droplet-like form. In FIG. 4, each pixel 401 is depicted in an active state.

With the oil 410 within an activated pixel 401 displaced following the application of a driving voltage to the pixel 401, light rays (e.g., light ray 416) can enter a pixel 401, pass through the pixel's transparent pixel electrode 411, pass through the color filter 405 located underneath the activated pixel 401, strike reflective layer 450, and then be reflected back out through the activated pixel 401. Because light ray 416 has passed through the pixel's corresponding color filter 405, light ray 416 will have taken on the color of that color filter 405. Upon being reflected out of the activated pixel 401, light ray 416 can be observed by an observer viewing the viewing surface 414 of device 400.

After activation of a pixel 401, when the voltage across electrowetting pixel 401 is returned to an inactive signal level of zero or a value near to zero (e.g., no voltage potential between that pixel's pixel electrode 411 and common electrode 455), the electrowetting pixel 401 will return to an inactive or closed state, where oil 410 flows back to cover hydrophobic layer 406 of that pixel 401. In this way, oil 410 forms an electrically controllable optical switch in each electrowetting pixel 401.

In this configuration, device 400 operates as a reflective display device, in which a viewer observes images generated by light being reflected out of device 400 at viewing surface 414.

In FIG. 4 device 400 is configured in a reflective configuration so that light entering open pixels 401 is reflected back out of the display device to viewing surface 414. In this configuration, the control circuitry for the pixels (that is, the combination of transistor switches and pixel electrodes 411) that applies driving voltage to activate certain pixels, thereby forming an image on viewing surface 414, is formed on or within top support plate 403 of the device. Oil 410 of device 400 adheres preferentially to hydrophobic layer 406 with no driving voltage applied to the pixels 401. When the driving voltage is applied, second fluid 412 (e.g., an electrolyte solution) is drawn upwards into the activated pixel 401 causing the oil 410 therein to be displaced enabling light to pass through the activated pixel 401.

The lower support plate, bottom support plate 402, has formed thereon the color filters 405 and reflective layer 450 that enable operation of device 400 in a reflective mode so that light entering an activated pixel 401 is reflected back out of the device.

Figure 5:
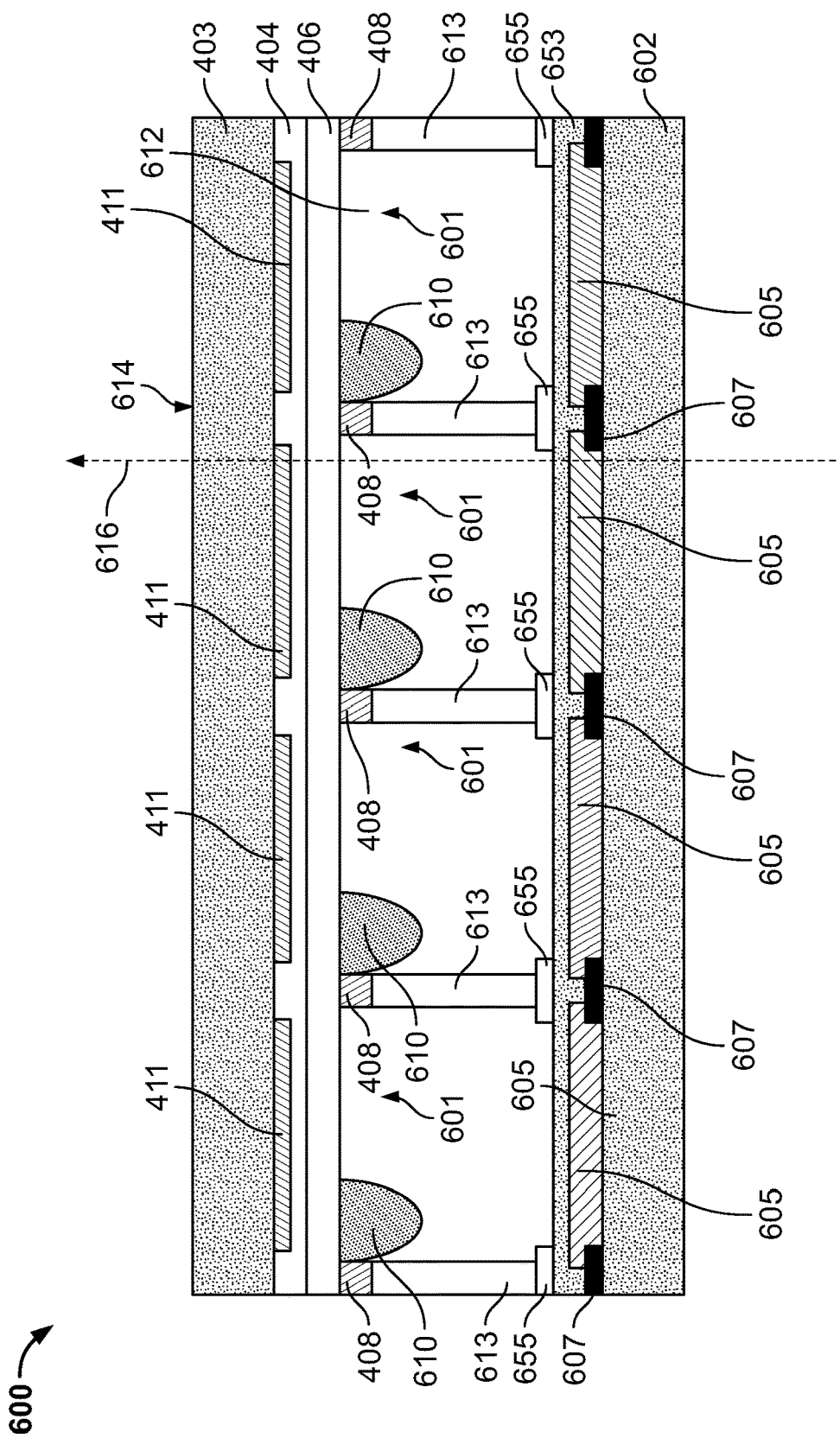
FIG. 5 is a cross sectional view of a portion of an electrowetting display device incorporating the present top support plate design and in a transmissive-mode configuration.
Figure 6:
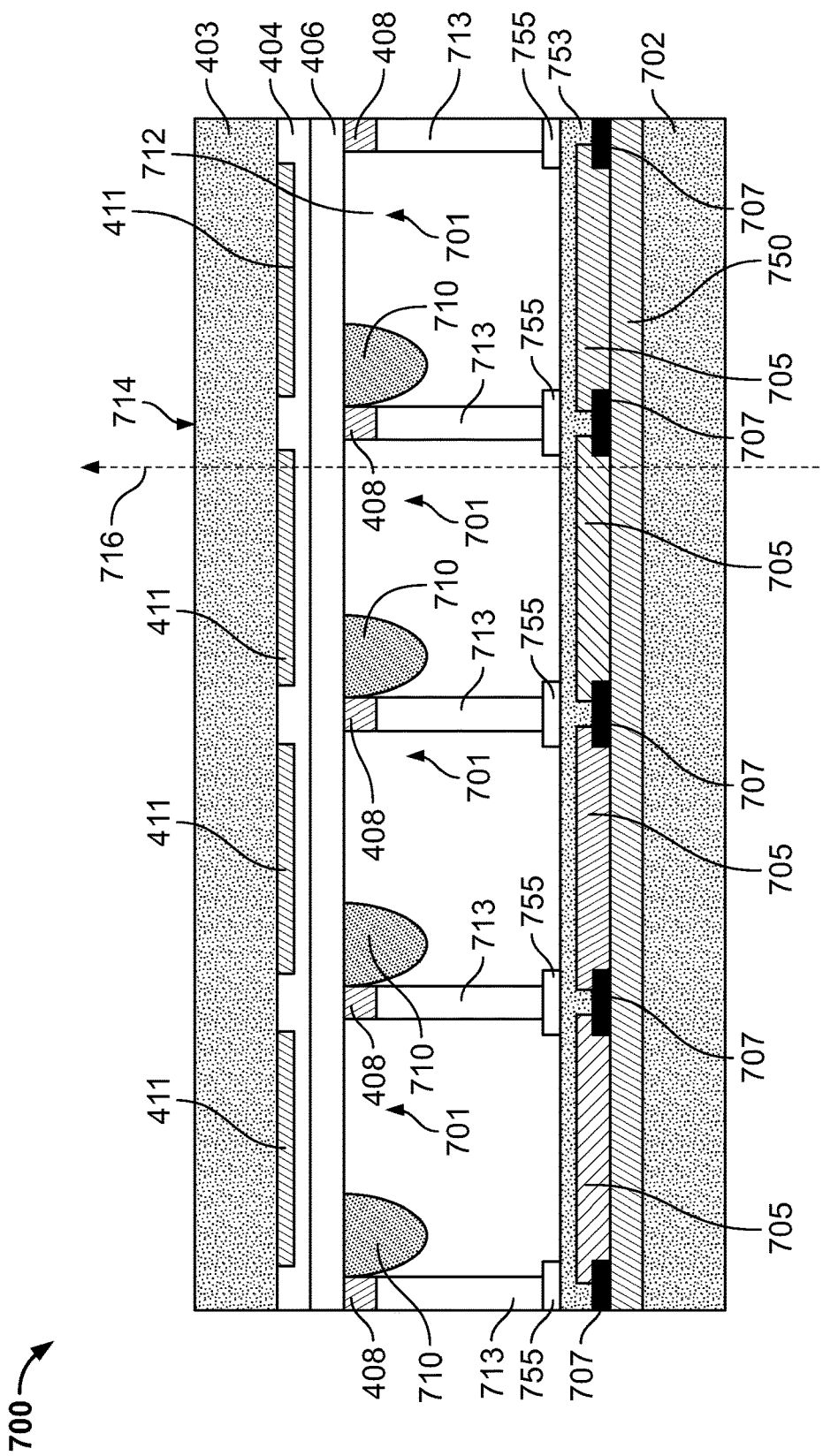
FIG. 6 is a cross sectional view of an alternative embodiment of the electrowetting display device depicted in FIG. 5

In contrast, FIGS. 5 and 6 depict device 600 having a different configuration to that of device 400 of FIG. 4. In device 600, a bottom support plate having a different configuration has been mounted to device 600 causing device 600 to operate as a transmissive display device. The new bottom support plate does not include a reflective layer and, as such, light entering one of active pixels of device 600 will be able to pass through the active pixel without being reflected.

Other than the modification of the bottom support plate, the configuration of devices 400 and 600 are substantially unchanged. And, specifically, the top support plates of both devices, as well as the structure formed thereon, are unchanged.

Accordingly, when manufacturing either reflective devices (e.g., device 400 of FIG. 4) or transmissive devices (e.g., device 600 of FIG. 5), the same device design and fabrication processes may be used to make the top support plate and the pixel array over that support plate. This, in turn, can simplify the manufacturing process of the pixel array support plate.

In each type of device, the bottom support plate will generally be same with the only difference being the incorporation of a reflective layer into the bottom support plate for reflective display devices. The bottom support plate further includes color filters and a common electrode. In the reflective configuration, the reflective layer can be formed as a contiguous blanket layer over the entire display area of the device, potentially resulting in higher reflectance in reflective-mode display devices.

Turning to FIG. 5, details of transmissive-mode display device 600 are illustrated. As described above, the top support plate 403 and accompanying structure are the same to that depicted in FIG. 4 and, as such, element numbers of those components are duplicated in FIG. 5. Specifically, FIG. 5 is a cross sectional view of a portion of electrowetting display device 600 incorporating the present top support plate design.

FIG. 5 shows device 600 with an electric potential applied to each depicted electrowetting pixel 601 of device 600 causing displacement of the oil 610 in each pixel 601. In this configuration, each pixel 601 is considered open or activated allowing light to enter each depicted pixel 601. Device 600 includes a bottom support plate 602 over which top support plate 403 is mounted.

A number of black matrix components 607 are formed over bottom support plate 602. Black matrix components 607 may be positioned to block light from passing through bottom support plate 602 and the pixel walls 408 overlaying black matrix components 607. If light were to pass through pixel walls 408, cross-talk could occur, resulting in visual artifacts.

A number of color filters 605 are formed over black matrix components 607 and bottom support plate 602. As explained above, each color filter 605 may be configured to allow a particular color (or range of colors) of light to pass through color filter 605, while blocking light of different colors. In some cases, color filters 605 may be white color filters, allowing all visible light to enter their respective pixels 601. In this manner, color filters 605 associate each of pixels 601 with a particular color, enabling device 600 to generate color images.

Organic layer 653 acts as an overcoat and is formed over color filters 605. A common electrode 655 is formed over organic layer 653. In this embodiment, common electrode 655 is formed from a transparent and conductive material, such as ITO. As depicted in FIG. 5, common electrode 655 is patterned over organic layer 653 so as to be primarily located underneath pixel spacers 613 and pixel walls 408. To the extent that common electrode 655 inhibits light transmission, patterning common electrode 655 in this manner can minimize an amount of light blocked by the structure of common electrode 655.

Pixels 601 are formed on top support plate 403. Specifically, as depicted in FIG. 5, pixels 601 are formed over a bottom surface of top support plate 403. Top support plate 403 may include glass or any of a number of transparent materials, such as transparent plastic, quartz, and semiconductors, for example.

An electrode layer is formed on top support plate 403. In various embodiments, the electrode layer may consist of one or more transparent individual pixel electrodes 411, each addressing an individual pixel 601. For example electrodes 411 may include ITO, conductive organic polymers, or other transparent conductive material. The individual pixel electrodes 411 may be connected to a transistor, such as a TFT (not shown), which may also be constructed using at least partially transparent materials. The transistors for each pixel 601 are generally configured to be switched or otherwise controlled to either select or deselect an electrowetting pixel 601 using an active matrix addressing scheme, for example. The TFTs and corresponding data lines may be formed within the electrode layer or within other layers over or within support plate 403. In an embodiment, the transistor associated with each pixel 601 may be embedded at least partially within dielectric barrier layer 404. In that case, to prevent light being reflected by the metal layers making up a portion of the transistors, transparent material (e.g., having an index of refraction greater than 2.0) can be formed between top support plate 403 and the structure of the transistors.

Dielectric barrier layer 404 is formed over the bottom surface of top support plate 403 and may at least partially separate top support plate 403 from hydrophobic layer 406, also formed over top support plate 403. Barrier layer 404 may be formed from various materials including organic/inorganic multilayer stacks or layers. In some embodiments, hydrophobic layer 406 is an amorphous fluoropolymer. Hydrophobic layer 406 may also include suitable materials that affect wettability of an adjacent material, for example.

Pixel walls 408 form a patterned electrowetting pixel grid on hydrophobic layer 406 over the bottom surface of top support plate 403. Pixel walls 408 may comprise a photoresist material such as, for example, epoxy-based negative photoresist SU-8. The patterned electrowetting pixel grid comprises rows and columns that form an array of electrowetting pixels 601.

Top support plate 403 is mounted over bottom support plate 602. In this configuration, when top support plate 403 is mounted over bottom support plate 602, pixel walls 408 rest upon a top surface of pixel spacers 613, which are, in turn, coupled to bottom support plate 602. With device 600 so constructed, device 600 has viewing surface 614 on which an image formed by electrowetting display device 600 may be viewed.

Oil 610 (or another opaque fluid) is deposited between top support plate 403 and bottom support plate 602. A second fluid 612, such as an electrolyte solution, is also deposited between top support plate 403 and bottom support plate 602. Oil 610 is immiscible with second fluid 612. Second fluid 612 is electrically conductive and/or polar, and may be water or a salt solution such as a solution of potassium chloride in water, for example. In certain embodiments, second fluid 612 is transparent, but may be colored or light-absorbing. Oil 610 is electrically non-conductive and may for instance be an alkane like hexadecane or (silicone) oil.

Hydrophobic layer 406 causes oil 610 to adhere preferentially to hydrophobic layer 406 because oil 610 has a higher wettability with respect to the surface of hydrophobic layer 406 than second fluid 612 in the absence of a driving voltage. Even in an inverted configuration (such as that illustrated in FIG. 5), where hydrophobic layer 406 is above oil 610, oil 610 will adhere to hydrophobic layer 406 preferentially. In some embodiments, a density of oil 610 may be less than a density of second fluid 612, which further would promote movement of oil 610 upwards (as depicted in FIG. 5) towards and against hydrophobic layer 406.

A driving voltage is applied to an electrowetting pixel 601 by establishing an appropriate driving voltage across the pixel's pixel electrode 411 and common electrode 655. If a driving voltage is applied across an electrowetting pixel 601 in this manner, the electrowetting pixel 601 will enter into an active or at least partially open state. Electrostatic forces will move second fluid 612 toward the pixel electrode 411 of the active pixel 601, thereby displacing oil 610 from that area of hydrophobic layer 406 to pixel walls 408 surrounding the area of hydrophobic layer 406, to a droplet-like form. In FIG. 5, each pixel 601 is depicted in an active state.

With the oil 610 within an activated pixel 601 displaced following the application of a driving voltage to the pixel 601, light rays (e.g., light ray 616) can pass through bottom support plate 602, pass through a color filter 605 located underneath an activated pixel 601, pass through the transparent pixel electrode 411 of the activated pixel 601, and then be viewed by a user at viewing surface 614. Because light ray 616 has passed through the pixel's corresponding color filter 605, light ray 616 will have taken on the color of that color filter 605.

After activation of a pixel 601, when the voltage across electrowetting pixel 601 is returned to an inactive signal level of zero or a value near to zero (e.g., no voltage potential between that pixel's pixel electrode 411 and common electrode 655), the electrowetting pixel 601 will return to an inactive or closed state, where oil 610 flows back to cover hydrophobic layer 406 of that pixel 601. In this way, oil 610 forms an electrically controllable optical switch in each electrowetting pixel 601.

In this configuration, device 600 operates as a transmissive display device, in which a viewer observes images generated by light passing through device 600 at viewing surface 614.

FIG. 6 is a cross sectional view depicting details of transmissive-mode display device 700. Display device 700 incorporates the same top support plate 403 and accompanying structure are the same to that depicted in FIG. 4 and, as such, element numbers of those components are duplicated in FIG. 6. Specifically, FIG. 6 is a cross sectional view of a portion of electrowetting display device 700 incorporating the present top support plate design.

FIG. 6 shows device 700 with an electric potential applied to each depicted electrowetting pixel 701 of device 700 causing displacement of the oil 710 in each pixel 701. Device 700 includes a bottom support plate 702 over which top support plate 403 is mounted.

A transparent electrode 750 is formed over bottom support plate 702. Transparent electrode 750 includes a material that is both conductive and substantially transparent, such as ITO. Common electrode 755 can be set to a common voltage, enabling common electrode 755 to work in conjunction with pixel electrodes 411 to operate effectively as a single common electrode to subject one or more pixels of device 700 to appropriate driving voltages. Transparent electrode 750 can be formed as a contiguous blanket layer over the entire display area of device 700 underneath the various pixels 701 of device 700. The display area of device 700 may include the area of bottom support plate 702 over which pixels 701 are positioned.

A number of black matrix components 707 are formed over transparent electrode 750. Black matrix components 707 may be positioned to block light from passing through bottom support plate 702 and the pixel walls 408 overlaying black matrix components 707. If light were to pass through pixel walls 408, cross-talk could occur, resulting in visual artifacts.

A number of color filters 705 are formed over black matrix components 707 and bottom support plate 702. Organic layer 753 acts as an overcoat and is formed over color filters 705. A common electrode 755 is formed over organic layer 753. In this embodiment, common electrode 755 is formed from a transparent and conductive material, such as ITO. As depicted in FIG. 6, common electrode 755 is patterned over organic layer 753 so as to be primarily located underneath pixel spacers 713 and pixel walls 408. Common electrode 755 is electrically connected to transparent electrode 750 enabling common electrode 755 and transparent electrode 750 to be set to the same common voltage.

Pixels 701 are formed on top support plate 403. Specifically, as depicted in FIG. 6, pixels 701 are formed over a bottom surface of top support plate 403. An electrode layer is formed on top support plate 403. In various embodiments, the electrode layer may consist of one or more transparent individual pixel electrodes 411, each addressing an individual pixel 701. Electrodes 411 may include ITO, conductive organic polymers, or other transparent conductive material. The individual pixel electrodes 411 may be connected to a transistor, such as a TFT (not shown), which may also be constructed using at least partially transparent materials. The transistors for each pixel 701 are generally configured to be switched or otherwise controlled to either select or deselect an electrowetting pixel 701 using an active matrix addressing scheme, for example. The TFTs and corresponding data lines may be formed within the electrode layer or within other layers over or within support plate 403. In an embodiment, the transistor associated with each pixel 701 may be embedded at least partially within dielectric barrier layer 404. In that case, to prevent light being reflected by the metal layers making up a portion of the transistors, transparent material (e.g., having an index of refraction greater than 2.0) can be formed between top support plate 403 and the structure of the transistors.

Dielectric barrier layer 404 is formed over the bottom surface of top support plate 403 and may at least partially separate top support plate 403 from hydrophobic layer 406, also formed over top support plate 403. Pixel walls 408 form a patterned electrowetting pixel grid on hydrophobic layer 406 over the bottom surface of top support plate 403. The patterned electrowetting pixel grid comprises rows and columns that form an array of electrowetting pixels 701.

Top support plate 403 is mounted over bottom support plate 702. In this configuration, when top support plate 403 is mounted over bottom support plate 702, pixel walls 408 rest upon a top surface of pixel spacers 713, which are, in turn, coupled to bottom support plate 702. With device 700 so constructed, device 700 has viewing surface 714 on which an image formed by electrowetting display device 700 may be viewed.

Oil 710 (or another opaque fluid) is deposited between top support plate 403 and bottom support plate 702. A second fluid 712, such as an electrolyte solution, is also deposited between top support plate 403 and bottom support plate 702. Oil 710 is immiscible with second fluid 712. Second fluid 712 is electrically conductive and/or polar and oil 710 is electrically non-conductive. Hydrophobic layer 406 causes oil 710 to adhere preferentially to hydrophobic layer 406.

A driving voltage is applied to an electrowetting pixel 701 by establishing an appropriate driving voltage across the pixel's pixel electrode 411 and common electrode 755 in combination with transparent electrode 750. If a driving voltage is applied across an electrowetting pixel 701 in this manner, the electrowetting pixel 701 will enter into an active or at least partially open state. Electrostatic forces will move second fluid 712 toward the pixel electrode 411 of the active pixel 701, thereby displacing oil 710 from that area of hydrophobic layer 406 to pixel walls 408 surrounding the area of hydrophobic layer 406, to a droplet-like form. In FIG. 6, each pixel 701 is depicted in an active state.

With the oil 710 within an activated pixel 701 displaced following the application of a driving voltage to the pixel 701, light rays (e.g., light ray 716) can pass through bottom support plate 702, pass through a color filter 705 located underneath an activated pixel 701, pass through the transparent pixel electrode 411 of the activated pixel 701, and then be viewed by a user at viewing surface 714. Because light ray 716 has passed through the pixel's corresponding color filter 705, light ray 716 will have taken on the color of that color filter 705.

In this configuration, device 700 operates as a transmissive display device, in which a viewer observes images generated by light passing through device 700 at viewing surface 714.

Figure 7:
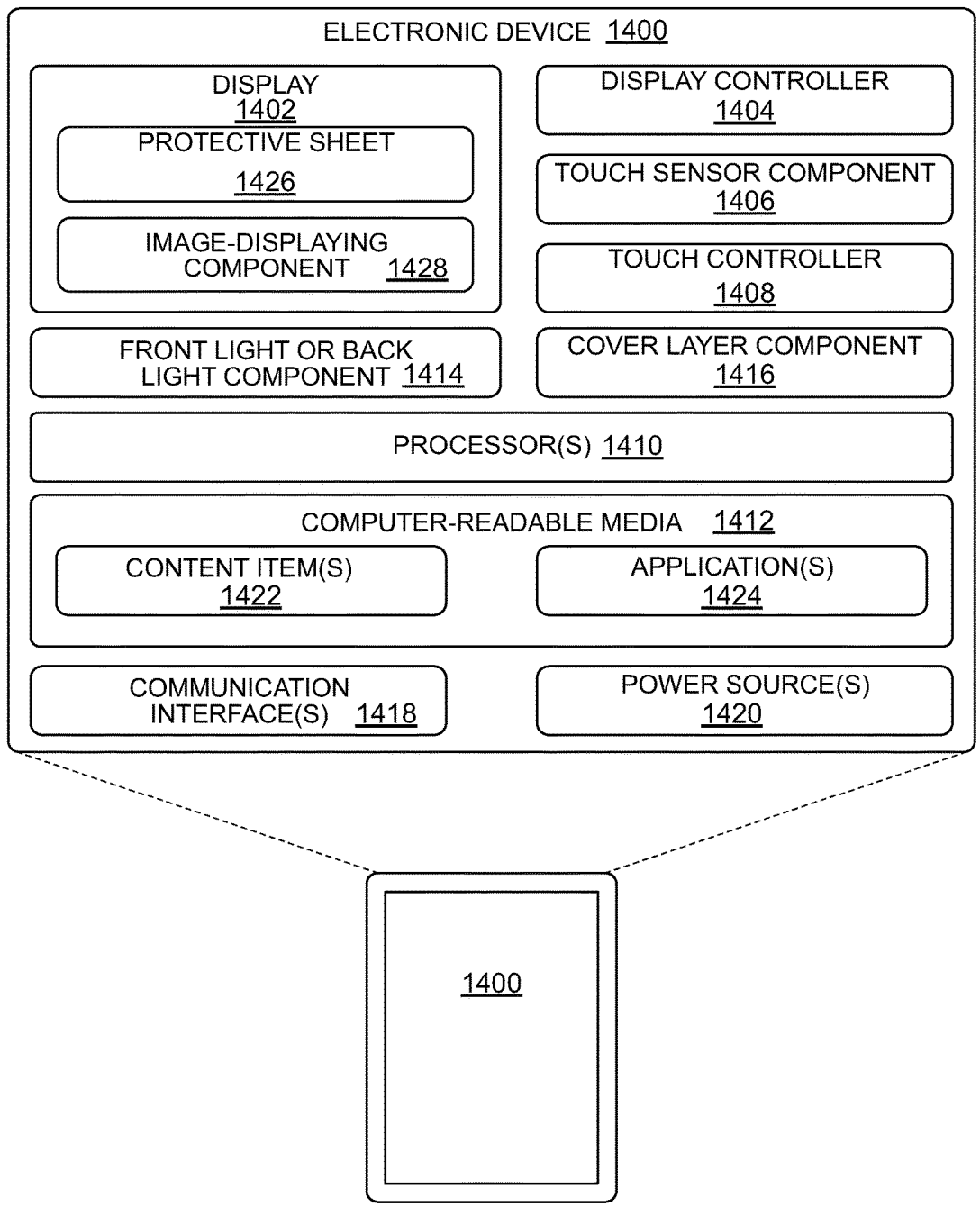
FIG. 7 illustrates an example electronic device that may incorporate a display device, according to various embodiments.

FIG. 7 illustrates an example electronic device 1400 that may incorporate any of the display devices discussed above. Electronic device 1400 may comprise any type of electronic device having a display. For instance, electronic device 1400 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1400 may be a non-mobile electronic device (e.g., a computer display or a television). In addition, while FIG. 7 illustrates several example components of electronic device 1400, it is to be appreciated that electronic device 1400 may also include other conventional components, such as an operating system, system busses, input/output components, and the like. Further, in other embodiments, such as in the case of a television or computer monitor, electronic device 1400 may only include a subset of the components illustrated.

Regardless of the specific implementation of electronic device 1400, electronic device 1400 includes a display 1402 and a corresponding display controller 1404. The display 1402 may represent a reflective or transmissive display in some instances or, alternatively, a transflective display (partially transmissive and partially reflective).

In one embodiment, display 1402 comprises an electrowetting display that employs an applied voltage to change the surface tension of a fluid in relation to a surface. For example, such an electrowetting display may include an array of pixels as described herein, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of the display are independently activated, display 1402 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a brightest red of the color filter. Furthermore, while some examples herein are described in the environment of a reflective display, in other examples, display 1402 may represent a backlit display, examples of which are mentioned above.

In addition to including display 1402, FIG. 7 illustrates that some examples of electronic device 1400 may include a touch sensor component 1406 and a touch controller 1408. In some instances, at least one touch sensor component 1406 resides with, or is stacked on, display 1402 to form a touch-sensitive display. Thus, display 1402 may be capable of both accepting user touch input and rendering content in response to or corresponding to the touch input. As several examples, touch sensor component 1406 may comprise a capacitive touch sensor, a force sensitive resistance (FSR), an interpolating force sensitive resistance (IFSR) sensor, or any other type of touch sensor. In some instances, touch sensor component 1406 is capable of detecting touches as well as determining an amount of pressure or force of these touches.

FIG. 7 further illustrates that electronic device 1400 may include one or more processors 1410 and one or more computer-readable media 1412, as well as a front light component 1414 (which may alternatively be a backlight component in the case of a backlit display) for lighting display 1402, a cover layer component 1416, such as a cover glass or cover sheet, one or more communication interfaces 1418 and one or more power sources 1420. The communication interfaces 1418 may support both wired and wireless connection to various networks, such as cellular networks, radio, WiFi networks, short range networks (e.g., Bluetooth® technology), and infrared (IR) networks, for example.

Depending on the configuration of electronic device 1400, computer-readable media 1412 (and other computer-readable media described throughout) is an example of computer storage media and may include volatile and nonvolatile memory. Thus, computer-readable media 1412 may include, without limitation, RAM, ROM, EEPROM, flash memory, and/or other memory technology, and/or any other suitable medium that may be used to store computer-readable instructions, programs, applications, media items, and/or data which may be accessed by electronic device 1400.

Computer-readable media 1412 may be used to store any number of functional components that are executable on processor 1410, as well as content items 1422 and applications 1424. Thus, computer-readable media 1412 may include an operating system and a storage database to store one or more content items 1422, such as eBooks, audio books, songs, videos, still images, and the like. Computer-readable media 1412 of electronic device 1400 may also store one or more content presentation applications to render content items on electronic device 1400. These content presentation applications may be implemented as various applications 1424 depending upon content items 1422. For instance, the content presentation application may be an electronic book reader application for rending textual electronic books, an audio player for playing audio books or songs, or a video player for playing video.

In some instances, electronic device 1400 may couple to a cover (not illustrated in FIG. 7) to protect the display 1402 (and other components in the display stack or display assembly) of electronic device 1400. In one example, the cover may include a back flap that covers a back portion of electronic device 1400 and a front flap that covers display 1402 and the other components in the stack. Electronic device 1400 and/or the cover may include a sensor (e.g., a Hall effect sensor) to detect whether the cover is open (i.e., if the front flap is not atop display 1402 and other components). The sensor may send a signal to front light component 1414 if the cover is open and, in response, front light component 1414 may illuminate display 1402. If the cover is closed, meanwhile, front light component 1414 may receive a signal indicating that the cover has closed and, in response, front light component 1414 may turn off.

Furthermore, the amount of light emitted by front light component 1414 may vary. For instance, upon a user opening the cover, the light from the front light may gradually increase to its full illumination. In some instances, electronic device 1400 includes an ambient light sensor (not illustrated in FIG. 7) and the amount of illumination of front light component 1414 may be based at least in part on the amount of ambient light detected by the ambient light sensor. For example, front light component 1414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1402 may vary depending on whether front light component 1414 is on or off, or based on the amount of light provided by front light component 1414. For instance, electronic device 1400 may implement a larger default font or a greater contrast when the light is off compared to when the light is on. In some embodiments, electronic device 1400 maintains, if the light is on, a contrast ratio for display 1402 that is within a certain defined percentage of the contrast ratio if the light is off.

As described above, touch sensor component 1406 may comprise a capacitive touch sensor that resides atop display 1402. In some examples, touch sensor component 1406 may be formed on or integrated with cover layer component 1416. In other examples, touch sensor component 1406 may be a separate component in the stack of the display assembly. Front light component 1414 may reside atop or below touch sensor component 1406. In some instances, either touch sensor component 1406 or front light component 1414 is coupled to a top surface of a protective sheet 1426 of display 1402. As one example, front light component 1414 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards display 1402; thus, illuminating display 1402.

Cover layer component 1416 may include a transparent substrate or sheet having an outer layer that functions to reduce at least one of glare or reflection of ambient light incident on electronic device 1400. In some instances, cover layer component 1416 may comprise a hard-coated polyester and/or polycarbonate film, including a base polyester or a polycarbonate that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, protective sheet 1426 may include a similar UV-cured hard coating on the outer surface. Cover layer component 1416 may couple to another component or to protective sheet 1426 of display 1402. Cover layer component 1416 may, in some instances, also include a UV filter, a UV-absorbing dye, or the like, for protecting components lower in the stack from UV light incident on electronic device 1400. In still other examples, cover layer component 1416 may include a sheet of high-strength glass having an antiglare and/or antireflective coating.

Display 1402 includes protective sheet 1426 overlying an image-displaying component 1428. For example, display 1402 may be preassembled to have protective sheet 1426 as an outer surface on the upper or image-viewing side of display 1402. Accordingly, protective sheet 1426 may be integral with and may overlay image-displaying component 1428. Protective sheet 1426 may be optically transparent to enable a user to view, through protective sheet 1426, an image presented on image-displaying component 1428 of display 1402.

In some examples, protective sheet 1426 may be a transparent polymer film in the range of 25 to 200 micrometers in thickness. As several examples, protective sheet 1426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1426 may include a coating, such as the hard coating described above. For instance, the hard coating may be applied to the outer surface of protective sheet 1426 before or after assembly of protective sheet 1426 with image-displaying component 1428 of display 1402. In some examples, the hard coating may include a photoinitiator or other reactive species in its composition, such as for curing the hard coating on protective sheet 1426. Furthermore, in some examples, protective sheet 1426 may be dyed with a UV-light-absorbing dye, or may be treated with other UV-absorbing treatment. For example, protective sheet 1426 may be treated to have a specified UV cutoff such that UV light below a cutoff or threshold wavelength is at least partially absorbed by protective sheet 1426, thereby protecting image-displaying component 1428 from UV light.

According to some embodiments herein, one or more of the components discussed above may be coupled to display 1402 using fluid optically-clear adhesive (LOCA). For example, the lightguide portion of front light component 1414 may be coupled to display 1402 by placing LOCA on the outer or upper surface of protective sheet 1426. If the LOCA reaches the corner(s) and/or at least a portion of the perimeter of protective sheet 1426, UV-curing may be performed on the LOCA at the corners and/or the portion of the perimeter. Thereafter, the remaining LOCA may be UV-cured and front light component 1414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1414. In other embodiments, the LOCA may be placed near a center of protective sheet 1426, and pressed outwards towards a perimeter of the top surface of protective sheet 1426 by placing front light component 1414 on top of the LOCA. The LOCA may then be cured by directing UV light through front light component 1414. As discussed above, and as discussed additionally below, various techniques, such as surface treatment of the protective sheet, may be used to prevent discoloration of the LOCA and/or protective sheet 1426.

While FIG. 7 illustrates a few example components, electronic device 1400 may have additional features or functionality. For example, electronic device 1400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1400 may reside remotely from electronic device 1400 in some implementations. In these implementations, electronic device 1400 may utilize communication interfaces 1418 to communicate with and utilize this functionality.

In an embodiment, an electrowetting display device includes a top support plate having a top surface and a bottom surface opposite the top surface, and a bottom support plate having a top surface and a bottom surface. The bottom support plate is opposite the top support plate. The electrowetting display device includes an oil between the top support plate and the bottom support plate, and an electrolyte fluid between the top support plate and the bottom support plate. The electrolyte fluid is immiscible with the oil. The electrowetting display device includes a plurality of pixel walls over the bottom surface of the top support plate. The bottom surface of the top support plate is between the plurality of pixel walls and the top surface of the top support plate. The plurality of pixel walls are associated with an electrowetting pixel and define a portion of a volume containing at least a portion of the oil and the electrolyte fluid. The electrowetting display device includes a transparent pixel electrode on the top support plate for applying a voltage within the electrowetting pixel to cause relative displacement of the oil within the electrowetting pixel to modify a reflectance of the electrowetting pixel, a reflector on the top surface of the bottom support plate, and a color filter on the reflector. The color filter allows propagation of visible light of a first color and prevents propagation of visible light of a second color.

In another embodiment, a device includes a top support plate including a top surface and a bottom surface and a viewing surface of the device is over the top surface of the top support plate, a bottom support plate opposite the top support plate, and a plurality of pixel walls over a bottom surface of the top support plate. The plurality of pixel walls are associated with an electrowetting pixel and define a portion of a volume containing at least a portion of a first fluid and a second fluid. The device includes a transparent pixel electrode on the top support plate, and a common electrode over a top surface of the bottom support plate. The common electrode includes a transparent material.

In another embodiment, a device includes a top support plate, a bottom support plate opposite the top support plate, and a plurality of pixel walls over a bottom surface of the top support plate. The plurality of pixel walls are associated with an electrowetting pixel and define a portion of a volume containing at least a portion of a first fluid and a second fluid. The device includes a pixel electrode on the top support plate. The pixel electrode includes a transparent electrode material. The device includes a reflector on the bottom support plate.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
   a top support plate having a top surface and a bottom surface opposite the top surface;
   a bottom support plate having a top surface and a bottom surface, the bottom support plate being opposite the top support plate;
   an oil between the top support plate and the bottom support plate;
   an electrolyte fluid between the top support plate and the bottom support plate, the electrolyte fluid being immiscible with the oil;
   a plurality of pixel walls over the bottom surface of the top support plate, wherein the bottom surface of the top support plate is between the plurality of pixel walls and the top surface of the top support plate, the plurality of pixel walls being associated with an electrowetting pixel and defining a portion of a volume containing at least a portion of the oil and the electrolyte fluid;
   a transparent pixel electrode on the top support plate for applying a voltage within the electrowetting pixel to cause relative displacement of the oil within the electrowetting pixel to modify a reflectance of the electrowetting pixel;
   a reflector on the top surface of the bottom support plate; and
   a color filter on the reflector, the color filter allowing propagation of visible light of a first color and preventing propagation of visible light of a second color.

2. The electrowetting display device of claim 1, further comprising:
   an organic layer over the color filter; and
   a common electrode on the organic layer, the common electrode including a transparent and conductive material, wherein the reflector is electrically connected to the common electrode.

3. The electrowetting display device of claim 1, further comprising a hydrophobic layer over the bottom surface of the top support plate and wherein the oil adheres to the hydrophobic layer preferentially and a density of the oil is less than a density of the electrolyte fluid.

4. The electrowetting display device of claim 1, wherein the plurality of pixel walls are associated with a second electrowetting pixel and the reflector includes a contiguous layer of metal located underneath both the electrowetting pixel and the second electrowetting pixel.

5. A device, comprising:
   a top support plate including a top surface and a bottom surface and a viewing surface of the device is over the top surface of the top support plate;
   a bottom support plate opposite the top support plate;
   a plurality of pixel walls over a bottom surface of the top support plate, the plurality of pixel walls being associated with an electrowetting pixel and defining a portion of a volume containing at least a portion of a first fluid and a second fluid;
   a transparent pixel electrode on the top support plate; and
   a common electrode over a top surface of the bottom support plate, the common electrode including a transparent material.

6. The device of claim 5, further comprising a reflector over the bottom support plate between the common electrode and the bottom support plate.

7. The device of claim 6, further comprising a color filter on the reflector, the color filter allowing propagation of visible light of a first color and preventing propagation of visible light of a second color.

8. The device of claim 6, further comprising a second electrowetting pixel over the bottom surface of the top support plate and the reflector includes a contiguous layer of metal located underneath both the electrowetting pixel and the second electrowetting pixel.

9. The device of claim 6, wherein the reflector is electrically connected to the common electrode.

10. The device of claim 5, further comprising a second common electrode over the bottom support plate between the common electrode and the bottom support plate, the second common electrode being electrically connected to the common electrode, the second common electrode including a layer of transparent conductive material.

11. The device of claim 10, wherein the plurality of pixel walls are associated with a second electrowetting pixel and the second common electrode includes a contiguous layer of transparent conductive material located underneath both the electrowetting pixel and the second electrowetting pixel.

12. The device of claim 5, further comprising a color filter over the bottom support plate between at least a portion of the common electrode and the bottom support plate, the color filter allowing propagation of visible light of a first color and preventing propagation of visible light of a second color.

13. The device of claim 12, further comprising:
- a second color filter over the bottom support plate between at least a second portion of the common electrode and the bottom support plate; and
- a black matrix component over the top surface of the bottom support plate between the first color filter and the second color filter.

14. The device of claim 5, further comprising a hydrophobic layer over the bottom surface of the top support plate and wherein the first fluid adheres to the hydrophobic layer and a density of the first fluid is less than a density of the second fluid.

15. A device, comprising:
- a top support plate;
- a bottom support plate opposite the top support plate;
- a plurality of pixel walls over a bottom surface of the top support plate, the plurality of pixel walls being associated with an electrowetting pixel and defining a portion of a volume containing at least a portion of a first fluid and a second fluid;
- a pixel electrode on the top support plate, the pixel electrode including a transparent electrode material; and
- a reflector on the bottom support plate.

16. The device of claim 15, further comprising a color filter on the reflector, the color filter allowing propagation of visible light of a first color and preventing propagation of visible light of a second color.

17. The device of claim 15, further comprising a second electrowetting pixel over the bottom surface of the top support plate and the reflector includes a contiguous layer of metal located underneath both the electrowetting pixel and the second electrowetting pixel.

18. The device of claim 15, further comprising:
- an organic layer over the reflector; and
- a common electrode on the organic layer, the common electrode including a transparent and conductive material.

19. The device of claim 18, wherein the reflector is electrically connected to the common electrode.

20. The device of claim 15, further comprising a hydrophobic layer over a bottom surface of the top support plate and wherein the first fluid adheres to the hydrophobic layer and a density of the first fluid is less than a density of the second fluid.

* * * * *